United States Patent Office 3,468,012
Patented Sept. 23, 1969

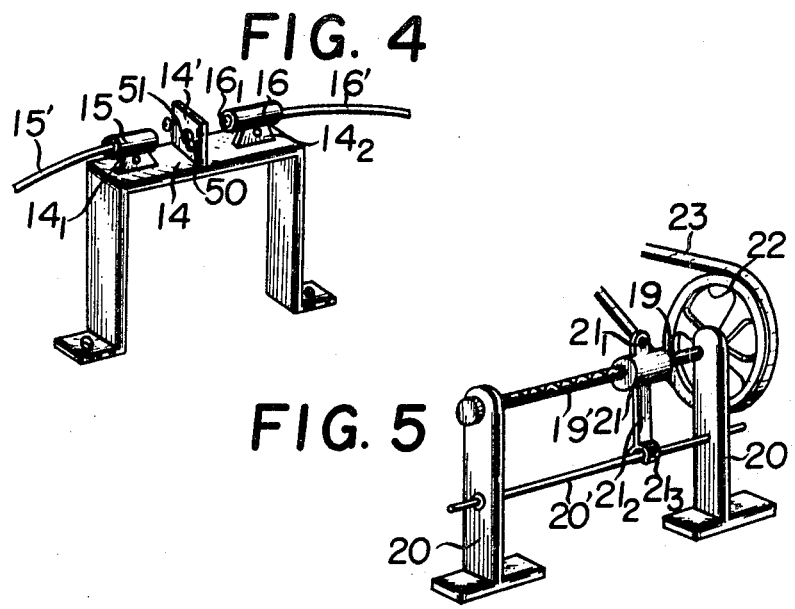
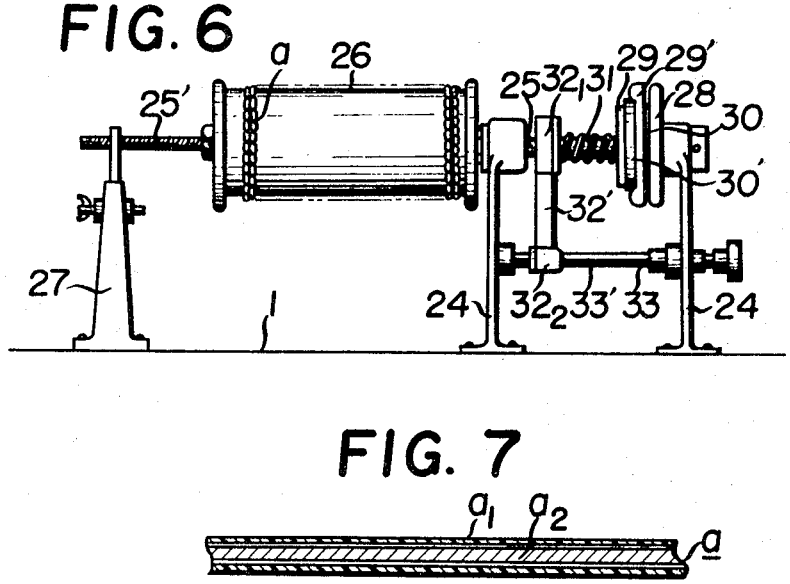
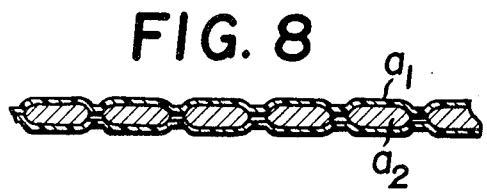

3,468,012
METHOD OF MAKING A LINEAR WEIGHT MEMBER
Hiromasa Hara, Gamagori-shi, Japan, assignor to Tokyo Rope Manufacturing Co., Ltd., Tokyo, Japan, a corporation of Japan
Filed June 8, 1966, Ser. No. 555,997
Int. Cl. B23p 11/02, 17/00
U.S. Cl. 29—400                                    3 Claims

ABSTRACT OF THE DISCLOSURE

A continuous linear weight is covered by a heat shrinkable tube to form a linear body. The linear body is then introduced under tension between press cutting gears to sever only the linear weight into pieces of short length, the linear body then being heated to cause the tube to undergo heat shrinkage to firmly hold the severed weight pieces in position.

---

This invention relates to a method of making a linear weight member comprising a series of spaced weight pieces having a configuration similar to spinning spindle which are neatly and firmly held in a tube of a synthetic resin, and to a method of making such a linear weight member.

Linear weight of the most usual construction consists of a linear body of soft metal having large specific gravity, i.e. lead. There are many applications of weight members where due considerations should be made with respect to flexibility, anti-fatigue property against bending and elongation, contamination to the articles to which the weight members are mounted and the like other problems in addition to their function as weight members, and hence linear weight members of simple construction are not suitable for such applications.

Examples of these applications include mounting of weight members to curtains or skirts of clothes to improve their vertical depending property and incorporation of weight members in the core portion of sinker ropes which are utilized to vertically and uniformly spread fishing nets. In the former case, linear lead weight member mounted on the lower edge of a curtain or skirt can not afford sufficient flexibility required for such an application. On the other hand, even when the linear lead weight member is divided into pieces, uniform weight effect and vertical depending property would be impaired. Moreover, bare lead weight members have a tendency to contaminate the clothes to which they are attached. In the latter case, since the weight members are subjected to severe handlings including, bending, elongation and twisting so that mere linear weight members having but little flexibility and anti-fatigue property are of no use. Further, weights of chain shaped configuration are not suitable because they are bulky and difficult to fabricate. Mounting of a plurality of separate and spaced weight pieces in the core of a rope is desirable to improve its flexibility, but in practice, it is difficult to incorporate these weight pieces into stranded ropes. Although it is possible to incorporate weight pieces into a braided rope having a central opening adapted to receive them, due to bending and elongation applied to the rope during its use, the weight pieces tend to move outwardly through the meshes of side yarns or vary their positions inside the rope thus resulting in non-uniform weight effect.

It is therefore the principal object of this invention to provide linear weights which can always exhibit sufficient flexibility and anti-fatigue property without losing their uniform weight effect under any operating condition and do not accompany such problems as contaminating articles to which they are mounted. The novel weight member comprises a plurality of weight pieces having a configuration like a spinning spindle and are neatly arranged in a tube of a synthetic resin, each of said weight pieces being firmly held in position by the inner wall of the tube and the assembled weight member is flexible between adjacent weight pieces.

Another object of this invention is to provide a novel method of manufacturing linear weight members of the construction described above on a mass production scale by simple and reasonable operations.

More particularly the method of manufacturing a linear weight member according to this invention is characterized by the steps of covering a continuous linear weight by a tube of a heat shrinkable synthetic resin, effectively severing into pieces of short length only the linear weight which acts as the core member by elongating said tube of synthetic resin, and causing said tube to undergo heat shrinkage to firmly secure spaced severed weight pieces in position whereby an extraordinary flexible linear weight member may be formed.

Stated more in detail, a linear body comprising a core of continuous linear weight which is inserted in a tube of a heat shrinkable synthetic resin is passed under tension through a cutting machine including press cutting teeth. When a linear body is subjected to tension, the major proportion of the tension will be applied to linear weight having smaller elongation than the tube. Accordingly, after pressed into a flat configuration between each pair of cooperating teeth of the press cutting teeth, the linear weight will be severed into separate pieces of short length assisted the action of said strong tension. Each of the severed pieces has a configuration like that of a spinning spindle having tapered opposite ends. The severed weight piece will be separated from the remaining portion of the linear weight so that the separated piece will be freed from the tension and all tension will be applied to the tube of synthetic resin to elongate it to separate severed weight pieces. However, the portion of the type which has been elongated in this manner will immediately restore to the original state upon removal of such tension so that the spacing between adjacent weight pieces will be reduced or adjacent weight pieces will contact each other because such weight pieces which are held by the inner wall of the tube will also be moved together with the contracting tube. This is the most favorable phenomenon that contributes to attain the object of this invention to provide extremely flexible linear weight members. Further, elongation of the tube occurring immediately subsequent to the severing action will result in the corresponding slack of the linear weight body and such a slack will affect the winding tension in the succeeding step. Accordingly, in order to prevent the elongated portion of the tube from being restored to the original state, it is important to provide a sufficiently large tension to the winding device (or the tension pulley to be described later) utilized in the succeeding step, the magnitude of the tension being determined by taking such a slack into consideration.

Thus, in the novel method it is most important to maintain the tube, for a while, in an elongated condition which occurs subsequent to the severing of the weight piece or in the more elongated condition whereby the elongated portion of the tube is prevented from being restored by heat treating the tube during said period. It is also necessary to cause heat shrunk portions of the tube between spaced weight pieces to further reduce the diameter of the tube thereby to completely eliminate the tendency of the opposing ends of the severed weight pieces to contact or cross each other.

By the reason explained hereinabove the linear weight body is advantageously made of a wire of soft metal having large specific gravity, i.e. lead or made of alloys of lead containing a suitable quantity of heavy metals having specific gravity close to that of lead, for example bismuth, antimony and the like. It is also essential that the tube is made of a relatively soft synthetic resinous material which has good elongation and flexibility so that it will not be damaged or severed when pressed by press cutting teeth at the time of severing the core material. The resin is also required to have a suitable heat shrinkage property. Soft vinyl chloride, polyethylene resin and the like are suitable for this purpose.

Further objects and advantages of this invention will be more fully understood from the following detailed description taken in connection with the accompanying drawings, in which.

FIGS. 3 to 6 inclusive are partial enlarged views respectively showing various portions of the apparatus;

FIG. 7 is a longitudinal sectional view of a linear body prior to working; and

FIG. 8 is a longitudinal sectional view of the linear body after working.

At first a linear starting blank $a$ comprising a continuous lead wire $a_2$ covered by a tube $a_1$ of soft vinyl chloride resin is prepared.

Figure 1:
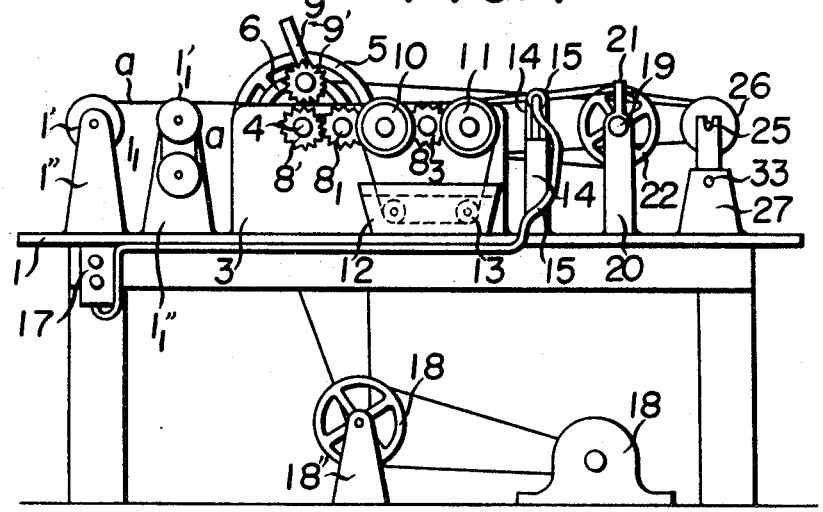
FIG. 1 is a side elevational view of an apparatus for manufacturing the linear weight members in accordance with this invention.
Figure 2:
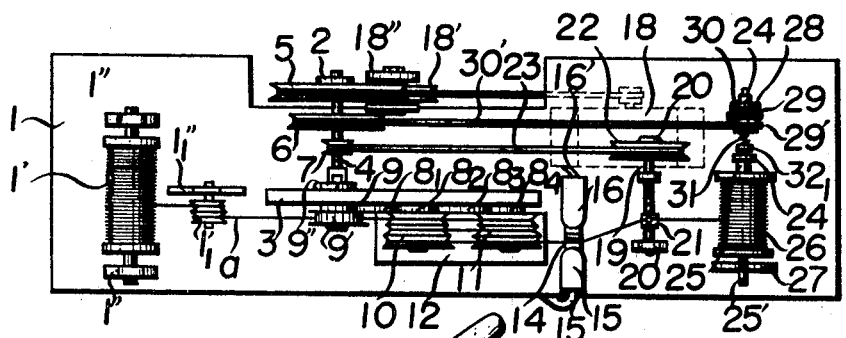
FIG. 2 is a plan view of the apparatus shown in FIG. 1.

As shown in FIGS. 1 and 2, the manufacturing apparatus comprises a pay-out bobbin for the linear body $a$, a guide roller means for adjusting the feed speed of the linear body $a$ which is unwound from the bobbin, a cutter gear mechanism including press cutting teeth adapted to press and sever the lead wire $a_2$ which acts as the core of the linear body, a tension pulley device used for elongating the linear body $a$ after press cutting, a heat treating device, means for detecting breakage of the linear body $a$, feed mechanism of the linear body $a$ and a take-up bobbin, which are arranged in the longitudinal direction upon a base 1, in the order mentioned.

Figure 3:
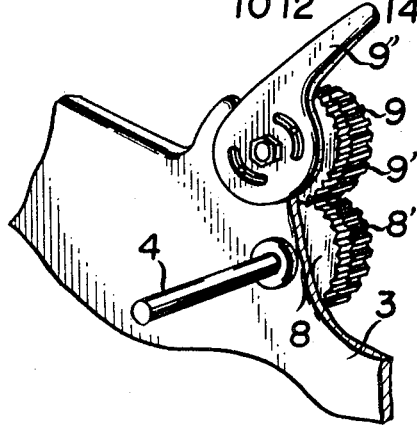

The detailed construction of respective devices or means will now be described. The pay-off bobbin 1' is rotatably supported by a pair of upright bearing pedestals 1'' secured on the base 1 and the guide roller means comprises a pair of rollers $1_1'$ each provided with two circumferential slots in which the linear body $a$ is wound, said pair of rollers $1_1'$ being rotatably journalled by bearing pedestals $1_1''$ and supported thereby in superposed relation. Adjacent to the guide roller means is journalled a horizontal shaft 4 by opposing upstanding bearing 2 and bearing plate 3 which also supports a series of gears 8, 9 . . . as described later. Pulleys 5, 6 and 7 having different diameters which reduce in the order mentioned are secured on the shaft 4, and a driving gear 8 which drives gears 9, $8_1$, $8_2$, $8_3$ and $8_4$ is secured to the extension of the shaft 4 projecting beyond the upright plate 3, a cutting gear 8' being integrally and coaxially secured to the gear 8. Immediately above the gear 8 is rotatably journalled a gear 9 by the upright plate 3 to mesh with the driving gear 8. Another cutting gear 9' having the same member of teeth and configuration as the cutting gear 8' is coaxially and integrally connected to the gear 9, these cutting gears 8' and 9' being arranged to cooperate such that their corresponding pairs of tooth tips engage each other. As shown in FIG. 3, by adjusting a lever 9'' an adjusting plate mounted coaxially with the gear 9 but on the opposite side of the upright plate 3 fine adjustment of the engagement between tooth tips of the cutting gears can be made. Gears $8_1$, $8_2$, $8_3$ and $8_4$ which are journalled by the upright plate 3 along a horizontal line are arranged to be successively driven by the driving gear 8 and gears $8_2$ and $8_4$ carry tension pulleys 10 and 11, respectively, which are integrally and coaxially secured thereto. Each of these tension pulleys is provided with several pulley grooves (3 in the example shown), the diameter at the valley of these grooves increasing from those nearest the upright plate 3 towards outside. A heating bath 12 is positioned on the base 1 just beneath the tension pulleys 10 and 11, which contains guide rolls 13 around which is passed the linear body $a$ between one set of grooves of the tension pulleys and another set or the outermost set of grooves thereof and through the heating bath.

Means for detecting breakage of the linear body $a$, which is located adjacent the other end of the upright plate 3, comprises an inverted U shaped pedestal 14 secured on the base 1, a supporting member 14' projecting upwardly from the middle portion of the upper yoke of the pedestal 14, a pair of ring shaped guides 50 disposed on the opposite sides of a perforation 51 drilled through the center of the supporting member 14' to insure that the linear body $a$ passes in front of said perforation 51, a light projector 15 and a light receiver 16 which are supported on the yoke of the pedestal 14 on the opposite sides of the perforation of the supporting member 14 by legs $14_1$ and $14_2$, respectively, as best shown in FIG. 4. The light projector 15 is connected to a socket 17 secured to the underside of the base 1 via an electric cord 15' while the light receiver 16 is connected to a driving motor 18 located beneath an electric cord 16' via suitable relaying means (not shown). Thus, it will be clear that the light emitted from the light projector 15 is received by the light receiver 16 after passing through the perforation 51 of the supporting member 14' in the absence of the linear body $a$ in front of the perforation.

As shown in FIG. 5, the feed mechanism comprises a rotary shaft 19 having a pair of oppositely directed screw threads 19' on its periphery and a pair of upright bearing pedestals 20 supporting the opposite ends of the shaft 19. A nut 21 engaging said screw threads 19' is mounted upon the shaft 19 to be reciprocated along it as the shaft 19 rotates. The nut 21 is provided with a vertical projection $21_1$ which extends upwardly and has an opening adapted to pass the linear body $a$ and a leg $21_2$ which projects downwardly and is provided with a bifurcation $21_3$ which is disposed to loosely embrace and slide along a horizontal bar 20' with its opposite ends journalled by the bearing pedestal 20. One end of the shaft 19 extends beyond one of the bearing pedestal 20 to support a pulley 22 which is connected to the smallest pulley 7 on the main shaft 4 via a belt 23.

As shown in FIG. 6, a take-up device which is mounted at the rightmost position of the base 1, as viewed in FIG. 11, in parallel with said feed mechanism, comprises a rotary shaft 25 journalled by a pair of upright bearing pedestals 24 secured on the base 1, and a shaft 25' which carries a takeup bobbin 26, one end of the shaft 25' being connected to the shaft 25 and the opposite end removably supported by a bearing pedestal 27. On one end of the shaft 25 which is supported by the bearing pedestals 24, are mounted a pair of closely spaced circular discs 28 and 29, one of the discs 28 which is located adjacent the shaft end being secured to the shaft whereas the other disc 29 being slidably mounted on the shaft 25. A buffer disc 30 made of a material of suitable coefficient of friction, leather for example, is interposed between discs 28 and 29 and hence the shaft 25, is driven by the main shaft 4 through a pulley 29' which is integral with the disc 29 and projecting inwardly and a belt passing around the pulley 29' and the intermediate pulley 6 on the main shaft 4. The discs 28 and 29 are normally held in the engaged state by a compression spring 31 which is disposed to surround the shaft 25 and interposed between the pulley 29' and an annular member $32_1$ which is secured on the upper end of an adjusting lever 32' to surround the shaft 25. A nut $32_2$ is secured to the lower end of the lever 32 to engage a screw thread 33' on the periphery of a horizontal rod 33 which is journalled by the intermediate portion of the bearing pedestals 24. Thus, by turning the rod 33, the nut $32_2$ will be moved along it to cause the annular member $32_1$ to slide along the shaft 25 to vary the compression of the spring 31. In this manner, the spring force tending to engage discs 28 and 29 through the buffer plate 30 is varied to vary the driving force transmitted to the shaft 25 from the main shaft 4 via the belt 30'.

In operation, an electric motor 18 is firstly energized to drive the main shaft 4 through a pulley 18' and the largest pulley 5 to rotate cutting gears 8' and 9' mounted on one end of the shaft 4 in the direction indicated by arrows. Then one end of a linear body $a$ wound on the payout bobbin 1' is unwound and passed through between gears 8' and 9'. The unwound linear body $a$ is passed around the grooves of guide rollers $1_1'$ before it is led to the cutting gears to be imparted with a suitable tension by the friction between said grooves of the guide rollers and the linear body $a$. The linear body $a$ introduced between cutting gears 8' and 9' is then clamped or pressed by successive corresponding pairs of teeth of the gears so that the lead wire $a_2$ is successively severed into pieces having a length corresponding to the pitch of the gear tooth. However, by the reason described above, the tube $a_1$ of synthetic resin remains unsevered. In this way, by suitable selection of the pitch of gears 8' and 9' lead pieces of any desired length may be formed.

The linear body $a$ which now contains pieces of lead wire $a_2$ at prescribed interval is then fed into tension pulleys 10 and 11 which are driven at a higher speed than cutting gears 8' and 9'. The linear body $a$ is firstly caused to pass around pulley grooves which are located nearest to the upright plate 3 and then around next pulley grooves of increased diameter to be elongated corresponding to the difference in the diameter of these grooves. Then the linear body $a$ is guided to pass around guide rollers $8_3$ immersed in the heating bath 12 and finally to pass around the outermost pulley grooves of tension pulleys 10 and 11 Accordingly, as the linear body $a$ is caused to pass around successive grooves of increasing diameter of tension pulleys 10 and 11 it will be gradually elongated to separate further the severed pieces of lead. Moreover, as the tube $a_1$ of synthetic resin is passed through the heating bath 12 which is maintained at about the initial softening temperature of the resin the tube $a_1$ will undergo heat shrinkage in the elongated state. Heat shrinkage is especially remarkable at portions between the severed ends of the lead pieces. Thus a linear weight member as shown in FIG. 8 is obtained wherein respective lead pieces $a_2$ are individually firmly held by the inner surface of the tube. As the synthetic resin which undergoes heat shrinkage may be used resins of vinyl chloride series such as polyvinyl chloride resin, polyvinylidene chloride resin, and thermoplastic resins such as polyehtylene resin and the like. It is also essential to use relatively soft synthetic resin so that only the core material is severed without causing any damage or breakage of the tube at the time when the core material is press cut by the cutting gears 8' and 9' utilized in the previous step.

As stated hereinbefore, by successively subjecting a continuous linear body $a$ which is unwound from the pay-off bobbin 1' to press cut, elongation and heat treatment it is possible to produce a continuous linear weight member in which individual lead pieces are firmly held by the inner wall of the resin tube $a_1$. However, the continuous linear weight member is often severed during said steps, especially while it is elongated by tension pulleys 10 and 11. In such an event it is necessary to immediately stop the driving motor 18 in order to stop the progress of the continuous linear body which is otherwise sent out at a constant speed from cutting gears 8' and 9'.

In the automatic fault detecting device shown in FIG. 4, the light emitted from a light source contained in the projector 15 is focussed by an optical lens (not shown) mounted on the front end thereof to illuminate the linear body $a$ passing through the pair of ring shaped guides 50 secured to the supporting member 14'. Consequently, when breakage occurs in the linear body $a$ so that it does not pass through the ring shaped guides 50 the light beam will be received by a photoelectric conductive element (not shown) contained in the light receiver 16 through an optical lens $16_1$ mounted on the front end thereof, whereby the electric resistance of the element is varied to generate an electric signal which is supplied to the driving motor 18 via said relaying means to automatically stop the motor. Such a fault may also be caused by the variation in the winding speed of the take-up bobbin 26. In the arrangement described above, upon occurrence of such a fault, the discs 28 and 29 which are normally coupled together through the cushion disc 30 are caused to slip by adjusting the spring 31, whereby to reduce the number of revolutions of the shaft 25 of the take-up bobbin. Thus, the winding speed of the linear body sent from the tension pulleys 10 and 11 is adjusted to prevent breakage of the linear body $a$.

The continuous weight member is wound upon the take-up bobbin 26 comprises a series of severed pieces of weight in the form of a spinning spindle which are independently and firmly held in position by a tube of synthetic resin, as shown by the longitudinal sectional view of FIG. 8, so that the weight member is very flexible and the relative positions of individual weight pieces are not disturbed by bending and elongation. Moreover, there is a merit that the weight pieces may not be released from the severed end of the weight member regardless of the position at which the weight member is severed. Accordingly the novel continuous weight member may be used in many applications. For example, it can be attached to the lower edge of curtains, and skirts of garments to improve their vertical depending property. Further it can be used as core members of braided ropes or stranded ropes to improve their weight effect as well as flexibility.

The press cutting device utilized to sever the linear weight body into pieces of short length is not limited to a pair of cutting gears with their corresponding pairs of teeth disposed to contact each other as described hereinabove, but any other suitable press cutting device, such as embodying the principle of flying shears, may be used which can elongate the linear body which is continuously supplied from the pay-out bobbin and can sever the linear body into pieces without stopping the continuous movement thereof.

While the invention has been described in terms of a preferred embodiment thereof it will be clear to those skilled in the art that the invention is not limited thereto and that many changes and modifications may be made without departing from the true spirit and scope of the invention as defined in the appended claims.

What is claimed is:

1. A method of making a linear weight member comprising the steps of:

preparing a linear body by covering a continuous linear weight of relatively soft and heavy metal with a heat shrinkable tube, said linear weight serving as a core material;

introducing said linear body under tension between cutting members to sever only said linear weight into pieces of short length;

heating said linear body under tension to cause said tube to undergo heat shrinkage to firmly hold said severed weight pieces in position by the wall of said tube.

2. The method of claim 1 wherein said linear body is introduced under tension between press cutting gears to sever only said linear weight.

3. The method of claim 1 wherein said heat shrinkable tube is made of a soft, flexible synthetic resin, such that a flexible linear weight member is produced.

References Cited
UNITED STATES PATENTS

| | | | |
|---|---|---|---|
| 1,439,449 | 12/1922 | Schloss | 29—413 |
| 2,729,265 | 1/1956 | Jones | 29—413 X |
| 2,992,457 | 7/1961 | Harrison | 264—230 |
| 3,195,225 | 7/1965 | Belliveaw et al. | 29—413 X |
| 3,336,913 | 8/1967 | McCormick | 29—447 X |

THOMAS H. EAGER, Primary Examiner

U.S. Cl. X.R.

29—413, 447; 161—175; 264—230, 342